(12) United States Patent
Kalwa

(10) Patent No.: US 12,403,677 B2
(45) Date of Patent: Sep. 2, 2025

(54) METHOD FOR PRODUCING A VENEERED WOODEN MATERIAL AND WOODEN MATERIAL COMPRISING A SUPPORTING PLATE AND AT LEAST TWO VENEERS

(71) Applicant: Flooring Technologies Ltd., Kalkara SCM (MT)

(72) Inventor: Norbert Kalwa, Horn-Bad Meinberg (DE)

(73) Assignee: Flooring Technologies Ltd., Kalkara (MT)

( * ) Notice: Subject to any disclaimer, the term of this patent is extended or adjusted under 35 U.S.C. 154(b) by 526 days.

(21) Appl. No.: 17/297,683

(22) PCT Filed: Dec. 18, 2019

(86) PCT No.: PCT/EP2019/086055
§ 371 (c)(1),
(2) Date: May 27, 2021

(87) PCT Pub. No.: WO2020/127556
PCT Pub. Date: Jun. 25, 2020

(65) Prior Publication Data
US 2022/0016872 A1 Jan. 20, 2022

(30) Foreign Application Priority Data
Dec. 19, 2018 (EP) .................................... 18213917

(51) Int. Cl.
*B32B 21/14* (2006.01)
*B32B 7/12* (2006.01)
(Continued)

(52) U.S. Cl.
CPC ............... *B32B 21/14* (2013.01); *B32B 7/12* (2013.01); *B32B 21/02* (2013.01); *B32B 37/10* (2013.01);
(Continued)

(58) Field of Classification Search
CPC ................................. B32B 21/14; B44C 5/043
See application file for complete search history.

(56) References Cited

U.S. PATENT DOCUMENTS

2006/0234009 A1* 10/2006 Roh ........................ B32B 21/02
428/521
2010/0015389 A1 1/2010 Zhang et al.
(Continued)

FOREIGN PATENT DOCUMENTS

| CN | 1735511 A | 2/2006 |
|---|---|---|
| CN | 1972799 A | 5/2007 |

(Continued)

OTHER PUBLICATIONS

Kalwa, N., Method for Producing a Wood Based Material, Aug. 5, 2015, machine translation of EP2902196 (Year: 2015).*
(Continued)

*Primary Examiner* — Scott W Dodds
(74) *Attorney, Agent, or Firm* — Bachman & LaPointe, P.C.

(57) ABSTRACT

The invention relates to a method for producing a wooden material having a supporting plate and at least one first, non-external veneer and a second veneer on a first surface of the supporting plate, wherein the supporting plate, the first and the at least second veneer are connected to one another by synthetic resin. In order to create a cost-effective wooden material board with a veneered surface,
 a liquid synthetic resin is applied, in excess, in relation to the quantity required for gluing purposes, to the supporting plate and/or to the first veneer and/or the at least second veneer,
 the synthetic resin applied in excess is dried but not cured,
 a stack of material to be pressed comprising the supporting plate, the first, non-external veneer and the at least second veneer is assembled, and
(Continued)

the stack of material to be pressed is compressed in a high-pressure press to form a wooden material.

22 Claims, 1 Drawing Sheet

(51) Int. Cl.
    *B32B 21/02*     (2006.01)
    *B32B 37/10*     (2006.01)
    *B32B 38/00*     (2006.01)
    *B32B 38/06*     (2006.01)
    *B44C 5/04*     (2006.01)
    *C08L 61/28*     (2006.01)

(52) U.S. Cl.
    CPC ............ *B32B 38/06* (2013.01); *B32B 38/145* (2013.01); *B44C 5/043* (2013.01); *C08L 61/28* (2013.01); *B32B 2307/4023* (2013.01); *B32B 2307/732* (2013.01); *B32B 2471/00* (2013.01)

(56) References Cited

U.S. PATENT DOCUMENTS

| | | | |
|---|---|---|---|
| 2011/0162308 A1* | 7/2011 | Park | B32B 21/00 52/309.3 |
| 2017/0305119 A1* | 10/2017 | Bergelin | B32B 3/20 |

FOREIGN PATENT DOCUMENTS

| | | | |
|---|---|---|---|
| CN | 103362288 A | 10/2013 | |
| CN | 103586944 A | 2/2014 | |
| EP | 2353861 A1 | 8/2011 | |
| EP | 2902196 A1 * | 8/2015 | ........... B32B 21/042 |
| JP | 2006514187 A | 4/2006 | |
| JP | 2017503688 A | 2/2017 | |
| WO | 2004098881 A1 | 11/2004 | |
| WO | 2015105456 A1 | 7/2015 | |
| WO | 2017162926 A1 | 9/2017 | |
| WO | 2018225844 A1 | 12/2018 | |

OTHER PUBLICATIONS

Machine translation of EP2902196 (Year: 2015).*
Office Action dated Aug. 28, 2023 for corresponding application JP2021-525027.
Chinese Office Action dated Feb. 16, 2023 for corresponding application No. 201980083963.3.
International preliminary report on patentability for application No. PCT/EP2019/086055 dated Jun. 16, 2021.
Office Action dated Dec. 21, 2023 for corresponding application JP2021-525027.

* cited by examiner

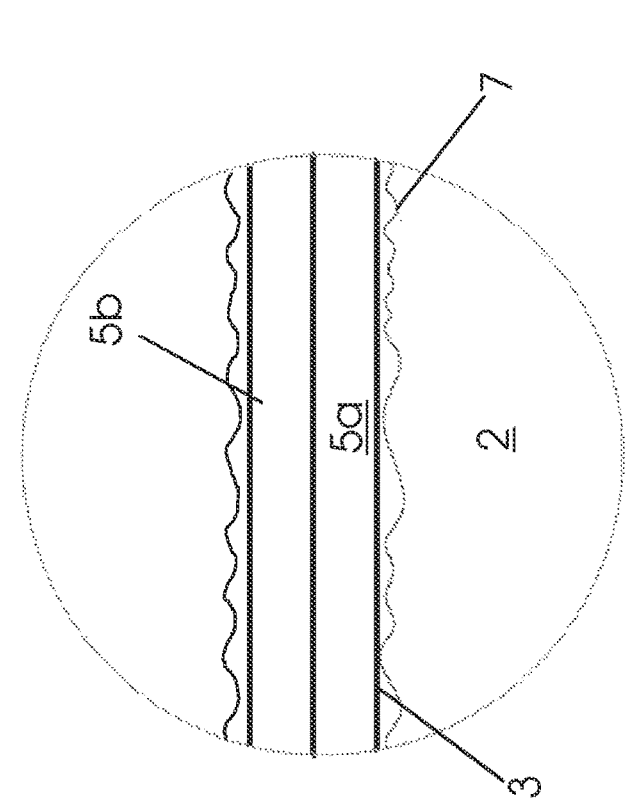
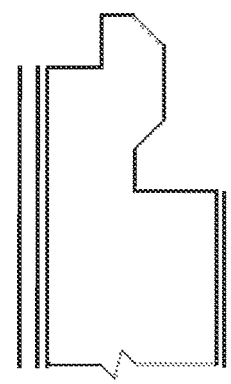
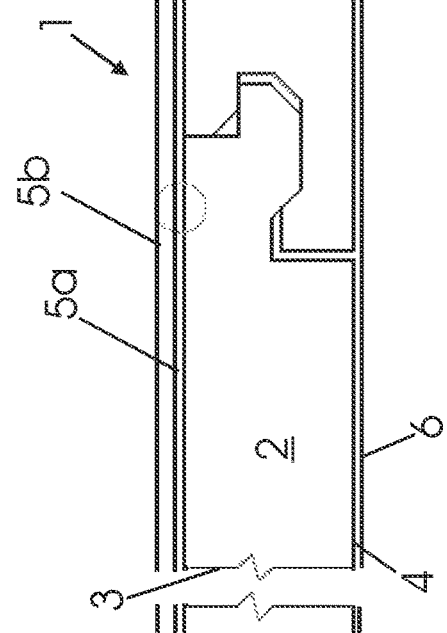
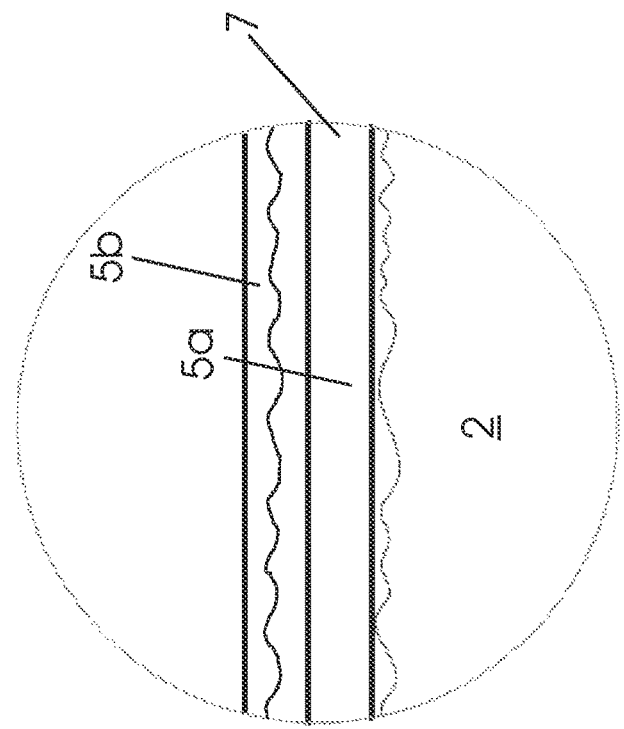

METHOD FOR PRODUCING A VENEERED WOODEN MATERIAL AND WOODEN MATERIAL COMPRISING A SUPPORTING PLATE AND AT LEAST TWO VENEERS

BACKGROUND OF THE INVENTION

The invention relates to a method for producing a wooden material wherein a supporting plate and at least two veneers are connected by a synthetic resin, as well as a wooden material board that is coated with at least two veneers.

Wooden materials that have a veneered surface are known from e. g. EP 2 902 196 A1. They consist of a wooden material support (e. g. HDF or high-density fiber board, OSB board, particle board), to which a synthetic resin layer is applied, which affixes a veneer by the synthetic resin penetrating the veneer. The veneers used typically have a thickness of 0.8 mm to 2.5 mm. The documents US 2011/0162308 A1, WO 2017/162926 A1, and EP 2 353 861 A1 also disclose veneered wooden material boards and methods for producing them.

Veneered surfaces are highly valued as real wood surfaces. They have a pleasing surface feel and generate pleasing acoustic conditions. Veneered surfaces are perceived as of particular high quality, wherein the thickness of the veneer applied is one of the criteria being evaluated. At the same time, veneers that are suitable as a cover layer for panels are the most expensive component of the wooden composite.

SUMMARY OF THE INVENTION

Therefore, this results in the object of providing a wooden material, wherein a high-quality veneer surface is provided on a supporting plate in a cost-effective manner.

This object is solved by a method as disclosed herein as well as by a wooden material board also as disclosed herein. The dependent claims claim particular embodiments of the invention.

The method for producing a wooden material is based on a supporting plate and a first, non-external veneer, both of which are connected to one another by means of a synthetic resin on a first surface of the supporting plate. According to the invention, at least a second veneer is applied to the first surface of the supporting plate, though, deviating from the prior art. The second veneer is applied to the first veneer. To connect supporting plate and veneer, a liquid synthetic resin is applied in excess to supporting plate and/or veneer. Excess here means the quantity of synthetic resin which, in relation to the quantity of synthetic resin required for gluing purposes, is additionally applied to supporting plate and/or veneer. Either, a person skilled in the art will know the quantity of synthetic resin required for gluing purposes from the instructions of the synthetic resin manufacturer, or they will know based on their technical knowledge, what synthetic resin quantity will be required for gluing veneer and supporting plate to one another. A typical application quantity for the synthetic resin that is used for affixing a veneer without excess quantity can amount to e.g. 60 g/m² to 100 g/m², most often 80 g/m². The quantity of synthetic resin required for gluing purposes can also potentially be determined by means of a few tests for orientation. Once the quantity of synthetic resin required for gluing purposes is known, the excess quantity can be determined with a few tests. Then, the synthetic resin applied in excess is dried but not cured. Supporting plate and veneer are assembled to form a stack of material to be pressed, and the stack of material to be pressed is compressed in a high-pressure press to form a wooden material.

In this manner, on the one hand, a thick veneer application can be achieved wherein a first cost-effective veneer and, on top of that, a high-quality, much thinner second veneer is used, such that a high-quality but cost-effective wooden material board with a veneer surface is provided. Thus, for example by using a 1.5 mm thick cost-effective poplar veneer as a first veneer and a 0.6 mm thick expensive oak veneer, a veneer layer on the supporting plate of 2.1 mm can be achieved at lower cost than by using a 2.1 mm oak veneer. The thickness of the at least one second veneer preferably amounts to 0.15 times to 0.3 times that of the first veneer. In general, if several veneers are used, the thickness of the outer-most veneer, which is also called the second veneer within the context of this invention, and which forms the visible surface of the wooden material, amounts to 0.15 times to 0.3 times the thickness of the veneers arranged underneath the outer-most veneer.

Furthermore, veneers of different colors can be used, such that a darker second veneer covers a lighter colored first veneer. By partially removing the second veneer, the first, lighter colored veneer becomes visible, such that for example the impression of inlaid wood work is generated. The color sequence described above is only one possible arrangement of at least two veneers on the first surface of a supporting plate. It is to be expressly understood that any given sequence of veneers of different colors can be arranged on the first surface of a supporting plate, and that with more than two veneers, the partial removal of the first and second veneers will generate an aesthetically attractive effect. The removal of the veneers down to the first surface of the supporting plate, too, generates an attractive aesthetic effect at low cost. A typical application of partial removal is the application of a chamfer at the transition from the first surface of a supporting plate to a side face. In this area, the veneers are then visible side by side. The surface designs described above appear to be of high-value. According to the invention, they can be provided easily and cost-effectively.

An embodiment of the method according to the invention provides that at least three, four, five, or more veneers are applied to the first surface of a supporting plate. Any given number of veneers can be applied to the first surface of a supporting plate on top of one another. The method according to the invention is limited only by the performance of the press described hereafter, which must be capable of softening the dried synthetic resin applied in excess through the veneers arranged on top of one another and to allow it to cure. Furthermore, color effects in the manner of a multiplex board can be generated at equal or different thicknesses of the first and at least second veneers arranged on top of one another on the side faces or chamfers of the supporting plate by arranging veneers on top of one another that have different colors. The more veneers are arranged on top of one another, the more pronounced this effect will be.

The method according to the invention works if all synthetic resin is applied to a surface of the supporting plate or a veneer. Preferably, the synthetic resin applied in excess is applied to the first surface of the supporting plate or a surface of the veneer that is a non-external surface, i.e., which is not the outer surface in the stack of material to be pressed or in the finished wooden material, which is in contact with the press plate, or which represents the surface of the wooden material. Further, it is preferred if the synthetic resin applied in excess is applied in at least two partial quantities to a surface of the supporting plate and/or a veneer. For example, a first partial quantity of the synthetic resin applied in excess is applied to the first surface of the supporting plate and the side of the first veneer opposite the second veneer, or to the side of the first veneer facing the supporting plate and the side of the second veneer facing the first veneer. Alternatively, both sides of the first veneer can each have applied to them a partial quantity of the synthetic resin which is applied in excess. Further alternatives result without constraints. The advantage of the synthetic resin applied in partial quantities is that the distribution of the synthetic resin—and thereby the bond between the veneers and the supporting plate—can be achieved particularly quickly and uniformly.

The method according to the invention provides that the stack of material to be pressed is compressed in a high-pressure press, typically a continuous or short-cycle press. The synthetic resin liquefied again at press-forming temperatures is compressed into the less dense veneer in this step; the typically denser surface of the supporting plate absorbs less synthetic resin. At the same time, the veneer is compressed by the pressure exerted by the high-pressure press. Both effects act in synergistic combination and increase the compressive strength of the veneer surface. The higher density after compression of the veneer is as much a contribution to a higher compressive strength as the at least portion-wise impregnation of the veneer with synthetic resin. Both measures contradict the usual measures for producing a wooden material with a veneer surface. On the one hand, synthetic resin which serves only to affix the veneer to the supporting plate is typically used sparingly with up to 100 g/m$^2$ (in relation to 100%) of solid material, and on the other hand, the press-forming in a high-pressure press is avoided in order to avoid compressing the veneer. However, it has been found that the visual and tactile aspects of the wooden material according to the invention remain unchanged in their aesthetically pleasing aspect.

An essential feature of the invention is that the synthetic resin is, in relation to the quantity required for gluing purposes, used in excess because it is provided that the synthetic resin once again liquefied during the press-forming operation, will partially penetrate the veneer or respectively penetrate between the fibers of the veneer and cure there. The ingress of the synthetic resin into the veneer is not necessary for affixing the veneer to the supporting plate, superficial contact with the synthetic resin is sufficient for that. The excess quantity in relation to the quantity of synthetic resin required for gluing the veneer amounts to at least 30%. Advantageously, the quantity of synthetic resin which is used for the method according to the invention amounts to more than 50%, preferably more than 100%, particularly preferably more than 200% of the quantity of synthetic resin required for gluing the veneer.

The introduction of substances that delay or stop the ingress of the synthetic resin into the veneer, e. g. sawdust, is disadvantageous. Sawdust is used in order to prevent synthetic resin from "breaking through", i.e., specifically the ingress of synthetic resin into the veneer up to the veneer surface. A current example of this is the "Lindura"® board described above. Preferably, no sawdust is used within the scope of the invention. The quantity specifications according to the invention can, based on the typical and known gluing of a veneer on a supporting plate and the quantities of synthetic resin used therefor of typically up to 100 g/m$^2$ based on 100% solid material, be determined and optimized by a specialist in the art with a few tests for orientation.

Even with a use of 130 g/m$^2$ of synthetic resin, the positive effects of the method according to the invention and of the wooden material according to the invention can be seen. According to an advantageous embodiment of the invention, at least 150 g/m$^2$ of synthetic resin are used in order to connect veneer and supporting plate and to increase the compressive strength of the veneer. Furthermore preferably, at least 200 g/m$^2$, in particular at least 300 g/m$^2$, advantageously up to 400 g/m$^2$ of synthetic resin are used. All figures given regarding the synthetic resin within the context of this invention relate to 100% solid material. The second veneer shall, in most applications, be impregnated with synthetic resin only partially, starting from the supporting plate or respectively the first veneer. The outer-most veneer surface, which is facing away from the supporting plate, of the at least second or respectively outer-most veneer is in this case a solid wood surface. It is, however, also easily possible to impregnate the first and the at least second veneer completely with synthetic resin, such that the synthetic resin covers the outer-most veneer surface, which is facing away from the supporting plate, of the at least second or respectively outer-most veneer.

This excess of synthetic resin can, irrespective of whether the entire quantity of synthe-tic resin or partial quantities are applied, often not be applied to the board in one work operation or respectively in one layer. According to an advantageous embodiment of the invention, the liquid synthetic resin is applied in a first and in a second layer, wherein the synthetic resin applied in the first layer is optionally dried before applying the second layer. This process can be repeated several times, e.g. if up to six or more layers of synthetic resin are applied to the supporting plate. During drying of the synthetic resin, it must be ensured that, although the flowing capability is reduced or preferably stopped, the reactivity of the synthetic resin must at least partially be retained, such that a bond between supporting plate, synthetic resin, and veneer is generated inside the press. After the drying, a residual minimum moisture content in the synthetic resin of at least 0.5 percent by weight is preferably achieved. The synthetic resin is thus dried after being applied in liquid form, but it is not cured. The dried synthetic resin can be tacky. In principle, the synthetic resin could also be applied to the veneer, but the low strength of the veneer typically allows only for the application of a partial quantity of the synthetic resin.

The synthetic resin can be tinted if desired, such that optically perceivable effects are achieved when the synthetic resin enters the veneer, either in order to obtain a higher-quality optical effect in combination with other measures such as applying a print to the veneer, or to cover the supporting plate, for example with a particularly thin veneer. Frequently used color hues are tan or brown color hues.

For the implementation of the invention, synthetic resins that first liquefy and then cure under pressure and the effect of increased temperature, in particular under the press conditions described below, are suitable. Particularly typical and suitable is melamine resin. If needed, corundum or other known additives can be introduced into the melamine resin, which e. g. improve the abrasion or scratching resistance of the surface. Fibers, in particular cellulose fibers, preferably hornified cellulose fibers, can be introduced into the melamine resin for a better layer formation. The urea-based or polyvinyl acetate glues typically used for gluing veneer on supporting plates are not well suited for use in a high-pressure press, on the one hand because they will not liquefy under the pressure and temperature conditions applicable there, and will consequently not penetrate the veneer and cure there. On the other hand, e. g. urea-based glue is not fade-resistant and would result in yellowing after a short amount of time where it penetrated the veneer to a large extent.

The stack of material to be pressed is compressed according to the invention in a high-pressure press. A typical veneer press for applying veneers to supporting plates, which operates with a press-forming pressure of 3 N/m² to 5 N/m², a press-forming temperature of up to 120° C., and a press-forming duration of three to five minutes is not sufficient for compressing and curing the large quantities of synthetic resin in an efficient manner, in particular within an acceptable amount of time. The pressure of the veneer presses furthermore is not adequate for compressing the veneers. According to the invention, it is therefore proposed to use high-pressure presses such as e.g. continuous presses or short-cycle presses, wherein a press-forming pressure of e.g. between 25 N/mm² and 50 N/mm² can be obtained. The press-forming time in a high-pressure press advantageously amounts to between 20 seconds and 60 seconds. The press-forming temperature preferably amounts to between 160° C. and 200° C. Under these conditions, which are harsh compared to a conventional veneer press, in particular with regard to the press-forming pressure, it is ensured that the synthetic resin penetrates the veneers at least portion-wise and that the veneers are compressed.

In a wooden material according to the invention, a supporting plate and a first and an at least second veneer are connected to one another on a first surface of the supporting plate by means of synthetic resin, wherein the veneers are compressed and the synthetic resin penetrates at least the first veneer and at least 30% of the veneer thickness of the at least second veneer. The first veneer need not have been penetrated by the synthetic resin in this context across the entire surface area along which the first and the second veneers are in contact with one another, but those areas where the first veneer is fully penetrated by the synthetic resin must merely suffice to connect the second veneer to the first veneer. According to a preferred embodiment, the synthetic resin penetrates at least 50% of the veneer thickness, advantageously at least 70% of the veneer thickness, but maximally 100% of the veneer thickness of the at least second veneer. These figures relate to the compressed first and at least second veneers. The penetrating of the veneer with synthetic resin is optically detected and measured by measuring the thickness of the veneer in total and the share of the veneer that was impregnated with synthetic resin.

According to another embodiment of the invention, the first and at least second veneers are advantageously compressed by at least 30% of the original thickness, preferably by at least 50% of the original thickness. The compressing of the first and the at least second veneers need not take place to the same extent. If the first and the at least second veneers have different thicknesses, the veneers will be compressed differently, too. Despite the compressing, an outer veneer surface facing away from the supporting plate, which is attractive from an aesthetic and surface feel point of view, is retained. Tests have shown that the introduction of an excess quantity of synthetic resin in relation to the actual gluing quantity is unproblematic because the once again liquefied synthetic resin displaces air from the veneer during compressing and penetrates intermediate spaces between the wood fibers and cures there. This way, the penetrating synthetic resin effects an increase in compressive strength.

The above description shows the numerous advantages of the method according to the invention or respectively the wooden material according to the invention. The method proposed here can be executed easily and, due to the short press-forming duration, also very efficiently with known installations. Tests for profiling the wooden material according to the invention have shown that the edge processing can be implemented in an easy and precise manner; tearing on the veneer, which is unfortunately common in known veneer boards after an edge cut, does not occur here. The wooden material according to the invention is suitable not only for wall and ceiling boards, but also for flooring. Additionally, the wooden material is excellent for use in furniture or furniture parts with surfaces that are subject to stress without having to do without the real wood surface in such cases. In particular, the good resistance to moisture, in particular when the synthetic resin penetrates the veneer by more than 50%, must be emphasized.

The veneer surface, i.e., the visible surface of the outer or respectively the at least second veneer of the wooden material that is facing away from the supporting plate can be subjected to a surface treatment before or during, but in particular even after compressing. In particular the embossing of the wood surface in order to obtain relief-like or three-dimensional structures that provide e.g. a pore structure specific to a wood-type can be performed during or after the compressing of the stack of material to be pressed. However, the application of a print to the veneer surface, e.g. in order to obtain a coloration of the veneer surface that is specific to a wood type, can also take place, preferably after the compressing of the stack of material to be pressed. According to an advantageous further embodiment of the invention, the embossing and print application take place in an interrelated manner, such that a synchronous decoration is produced, wherein coloration and color arrangement as well as embossing are harmonized synchronously to one another. The embossing and print application can in particular be used in order to lend a veneer that has low optical appeal a higher-quality aspect or to provide veneers arranged next to one another the optical appearance of which is too different with a more uniform look.

The veneer surface to which potentially a print is applied and/or which is embossed can then be oiled or varnished. Oiling and varnishing are common protective measures for veneer surfaces. Alternatively, the potentially printed and/or embossed veneer surface can also be coated with an overlay, i.e., a paper impregnated with synthetic resin, as is commonplace with predominantly laminate products. The press-forming conditions in a high-pressure press suffice to affix an overlay to the veneer surface.

The stack of material to be pressed can, according to another embodiment of the invention, also have an underlay, a paper or non-woven fabric which is potentially impregnated with synthetic resin, which is bonded to supporting plate and veneer during compressing. The underlay is typically arranged between supporting plate and first veneer, but it can also be arranged between the first and the second veneers. A paper or in particular a non-woven fabric, which is e. g. used with a grammage of 30 g/m² to 50 g/m², provides the first and the second veneer on the wooden material according to the invention with a further increased compressive strength since the non-woven fabric distributes and deflects compressive forces acting on the veneers. When a ball in the drop ball test as per DIN EN 13329 acts on the veneer surface of a wooden material, the ball will leave behind a smaller ball indentation, i. e. a smaller deformation, if a non-woven fabric or a paper is arranged underneath the outer or respectively at least second veneer or underneath the first veneer. A paper or a non-woven fabric can also prove advantageous even if the veneer is processed with smaller dimensions than the supporting plate. It simplifies the assembling of the stack of material to be pressed substantially if the veneer pieces of the first and/or the second veneer have been assembled and affixed to a paper or non-woven fabric beforehand, which has the dimensions of the supporting plate. The composite of paper or non-woven fabric and veneer pieces can then be easily arranged on the supporting plate that was coated with the liquid and then dried synthetic resin.

If a non-woven fabric or paper is arranged, in particular under the at least second veneer or respectively the outer-most veneer of the wooden material according to the invention, such non-woven fabric or paper, which by itself already generates an increase in strength as described above, can additionally be provided with additives that improve e. g. flammability, conductivity, resistance to ingress of moisture, fungi, insects, or the like. Alternatively, the at least second or respectively the outer-most veneer can be provided with such additives.

On an underside of the supporting plate facing away from the first surface coated with the first and second veneers that are arranged on top of one another, a backing can be arranged according to an advantageous embodiment of the invention, which ensures balanced stress ratios on the two coated sides of the supporting plate. The backing can be embodied in different ways, e. g. by applying a paper impregnated with resin, with a synthetic resin layer, or by applying a veneer. Alternatively, the underside of the supporting plate can be coated with the same or a comparable sequence of a first and an at least second veneer, which are affixed with synthetic resin that is applied in excess. If a synthetic resin layer is chosen for a backing, it can optionally be provided with fibers. The stresses which build up on the surface of the supporting plate and potentially in the veneer, can potentially be reduced by moistening. Since water can still penetrate into the stack of material to be pressed even after the liquid synthetic resin is dried, lower stresses will advantageously build up in view of the excess quantity of synthetic resin and the water contained therein, such that a wooden material can be produced without a backing, or respectively the backing has to compensate for lesser forces acting on the material.

As a supporting plate, wooden material boards such as mineral or synthetic resin bonded wooden material boards, particle boards, OSB boards, HDF boards (high-density fiber boards or medium-density fiber boards with increased raw density), or medium-density fiber boards (MDF boards) can be used, but plywood boards, veneer boards, blockboards, laminboards, or solid wood boards can also be used. Due to the excess quantity of synthetic resin, the method according to the invention is tolerant vis-à-vis irregularities of the board surface, such that even boards with a coarser surface structure can be used.

The first and the at least second veneer can be a peeled veneer, a saw-cut veneer, or a sliced veneer. The veneer used can be embossed or a print can be applied to it, but veneers affixed to non-woven fabric or paper, in particular assembled veneer pieces, can also be used.

BRIEF DESCRIPTION OF THE DRAWINGS

Details of the invention are explained in greater detail using exemplary embodiments. In the drawings:

FIG. 1 shows a schematic representation of the wooden material according to the invention, FIG. 2 shows a schematic representation of the first and second veneers that are fully penetrated by synthetic resin, FIG. 3 shows a schematic representation of the first veneer, which is fully penetrated by the synthetic resin, and of the second veneer, which is partially penetrated by synthetic resin.

DETAILED DESCRIPTION

FIG. 1 shows a schematic representation of the veneered wooden material 1 according to the invention, here a supporting plate 2 with two veneers on a first surface, the top face 3. The supporting plate 2 has a top face 3 and an underside 4. On the top face 3, a first veneer 5*a* and, above it, a second veneer 5*b* are arranged, on the underside 4, a backing 6 is arranged. Between supporting plate 2 and first veneer 5*a*, a synthetic resin layer 7 is arranged, wherein the synthetic resin 7 has fully penetrated the first veneer 5*a* and has penetrated about 50% of the second veneer 5*b* (see FIG. 2). FIG. 3 shows a supporting plate 2 with a first and a second veneer 5*a*, 5*b*, which are fully penetrated by synthetic resin.

With the embodiment according to FIG. 1-3, the entire synthetic resin applied in excess was arranged as a layer 7 on the top face 3 of the supporting plate 2. Alternatively, however, it is also possible to arrange the synthetic resin on a veneer surface of the first or second veneer. In this context, it is particularly preferred if the synthetic resin is not applied to the external surface of the outer-most veneer, here the second veneer 5*b*. The synthetic resin can additionally be applied in several layers, both to the supporting plate and to a veneer, e. g. to the top face 3 of the supporting plate 2 and between the first and the second veneer 5*a*, 5*b*. The application in several layers to supporting plate and/or veneer results in a particularly uniform distribution of the synthetic resin.

As a supporting plate, any of the boards described above made from wood or wooden material can be used. The HDF boards chosen in the following can without any problems be replaced with other board types. As a veneer, any of the veneers mentioned above can be used, the veneers used as an example in the following can be replaced with other types of veneer at any time. Both for the supporting plates and for the veneer, board or veneer thicknesses or the density of the veneer can vary.

In the following, specific press-forming conditions are stated for producing the wooden material according to the invention. It must be stated that these are merely selected press-forming conditions, the pressure, temperature, and time intervals stated above allow for a variation in press-forming conditions, for example a shortening of the press-forming time with increased pressure or increased temperature, or an increase in both parameters. The same applies to a reduction of pressure and/or temperature with a concomitant lengthening of the press-forming duration.

Exemplary Embodiment 1

A melamine resin (75% solid material, applied quantity: 300 g/m$^2$) is rolled onto a first surface of a large-format supporting plate, here e. g. an HDF board (medium-density fiber board with increased raw density, format: 2800× 2070×8 mm). This resin is produced e.g. by adding powdered melamine resin to liquid melamine resin (65 percent by weight). The melamine resin applied to the first surface of the supporting plate is dried in a circulating air dryer to a residual moisture content of approx. 10%. Subsequently, four veneers are placed on the dried melamine resin. Such veneers are oak and birch veneers in alternating order with a thickness of 0.6 mm each. The set-up was compressed in a short-cycle press at 200° C., 400 N/cm² press-forming pressure, and a press-forming time of 25 seconds. After press-forming, the thickness of the veneers was 1.8 mm in total. By means of a cross-cut test, the adhesion of the veneer layers to one another was checked after cooling. This adhesion was good, i.e., even the outer-most veneer was firmly connected to the supporting plate or respectively the veneer arranged underneath the outer-most veneer. Afterwards, partial boards with a format of 2800×205 mm were saw-cut from the large-format board. A profile for laying without glue and a circumferential chamfer were milled into these partial boards. After laying, a multiplexed visual effect was discernable in the visible connect area (the chamfer).

Exemplary Embodiment 2

A melamine resin (75% solid material, applied quantity: 300 g/m²) is rolled onto a large-format supporting plate, here an HDF board (medium-density fiber board with increased raw density, format: 2800×2070×8 mm). This resin is produced by adding powdered melamine resin to liquid melamine resin (65 percent by weight). The melamine resin is dried in a circulating air dryer to a residual moisture content of approx. 10%. Subsequently, a first veneer, a birch veneer, is placed on the melamine resin, and a second veneer, a mahogany veneer, is placed on the first veneer or respectively birch veneer. The mahogany veneer has a thickness of 0.5 mm and the birch veneer has a thickness of 1.5 mm. The set-up was compressed in a short-cycle press at 200° C., 400 N/cm² press-forming pressure, and a press-forming time of 25 seconds. By means of a cross-cut test, the adhesion of the veneer layers to one another was checked after cooling. The adhesion was good. Afterwards, partial boards with a format of 2800×205 mm were saw-cut from the large-format board. A profile for laying without glue was milled into these partial boards.

The thus produced board shows a perfect mahogany surface. Contrary to a 2 mm mahogany veneer as an alternative, the board according to the invention is significantly more cost effective due to the use of the cost-effective birch veneer.

Exemplary Embodiment 3

A melamine resin (75% solid material, applied quantity: 300 g/m²) is rolled onto a large-format supporting plate made from HDF (medium-density fiber board with increased raw density, format: 2800×2070×8 mm). This resin is produced e.g. by adding powdered melamine resin to liquid melamine resin (65 percent by weight). The melamine resin is dried in a circulating air dryer to a residual moisture content of approx. 10%. Subsequently, three veneers are placed on the melamine resin. Each of these veneers were oak veneers with a thickness of 0.7 mm. A non-woven fabric made from cellulose fibers with a grammage of 100 g/m², which is equipped with conductive additives such as 2 percent by weight to 5 percent by weight carbon fibers or conductive carbon black, in relation to the non-woven fabric, is placed on top of the first, lowest-level veneer. The second and the third oak veneers are placed on top of this. The set-up was compressed in a short-cycle press at 200° C., 400 N/cm² press-forming pressure, and a press-forming time of 25 seconds. The synthetic resin liquefies in the press, it penetrates the non-external veneers at least in portions completely and penetrates the outer-most veneer at least partially. By means of a cross-cut test, the adhesion of the veneer layers to one another was checked after cooling. The adhesion was good.

Afterwards, partial boards with a format of 2800×205 mm were saw-cut from the large-format board. On these partial boards, a profile for laying without glue was milled, and thereby a flooring element was produced. In the lower regions of the profile, in which the layer with the conductive non-woven fabric is located, a strip of conductive silver varnish is sprayed with regular spacing (every 5 cm), which increases the electric conductivity. After applying a voltage of 12 V, the flooring element output approx. 80 W/m².

The thus produced partial boards have a significantly improved conductivity compared to similar partial boards without a conductive non-woven fabric.

The invention claimed is:

1. A method for producing a wooden material (1) with a supporting plate (2) and a first veneer (5a) and at least a second veneer (5b) on a first surface (3) of the supporting plate, wherein the first veneer (5a) is non-external, and the supporting plate (2), the first veneer (5a) and the second veneer (5b) are connected to one another by means of synthetic resin (7), wherein the method comprises:
   applying the synthetic resin (7) in an amount of at least 150 g/m², given as 100% solid material, and thereby in excess in relation to the quantity required for gluing purposes, to only one surface of the supporting plate (2) or the first veneer (5a) or the second veneer (5b),
   drying but not curing the synthetic resin (7),
   assembling the supporting plate (2), the first veneer (5a), and the second veneer (5b) to form a stack of material to be pressed, and
   compressing the stack of material to be pressed in a high-pressure press at a press-forming pressure of 25 N/mm² to 50 N/mm², at a pressing-forming time of 20 seconds-60 seconds, whereby the synthetic resin from the only one surface penetrates at least the first veneer (5a) to secure the first veneer (5a) to the supporting plate (2) and to secure the second veneer (5b) to the first veneer (5a) and thereby to form the wooden material (1) with the supporting plate (2) and the first veneer (5a) and the second veneer (5b) connected with the first veneer (5a) between the supporting plate (2) and the second veneer (5b).

2. The method according to claim 1, wherein at least three veneers are applied to the first surface (3) of the supporting plate (2).

3. The method according to claim 1, further comprising applying a first partial quantity of the synthetic resin (7) and at least one further partial quantity of the synthetic resin to the only one surface.

4. The method according to claim 1, wherein the synthetic resin (7) is applied in excess of at least 30% in relation to the quantity required for gluing purposes.

5. The method according to claim 4, wherein the synthetic resin (7) is in excess of at least 50% in relation to the quantity required for gluing purposes.

6. The method according to claim 4, wherein the synthetic resin (7) is in excess of at least 100% in relation to the quantity required for gluing purposes.

7. The method according to claim 4, wherein the synthetic resin (7) is in excess of at least 200% in relation to the quantity required for gluing purposes.

8. The method according to claim 4, wherein the synthetic resin (7) is in excess of at least 400% in relation to the quantity required for gluing purposes.

9. The method according to claim 1, wherein the applying step comprises applying the synthetic resin (7), given each time as 100% solid material, with a quantity of at least 200 g/m² to the only one surface.

10. The method according to claim 9, wherein the quantity is at least 300 g/m².

11. The method according to claim 1, wherein the compressing step compresses the first veneer and the second veneer (5a, 5b) during compressing by at least 30% of an original veneer thickness.

12. The method according to claim 11, wherein the first veneer and the second veneer (5a, 5b) are compressed during the compressing by at least 50% of the original veneer thickness.

13. The method according to claim 1, further comprising surface treating or applying a print to an outer veneer surface of the wooden material (1).

14. The method according to claim 13, wherein the outer veneer surface of the wooden material is embossed, oiled or varnished.

15. The method according to claim 1, further comprising embossing an outer veneer surface of the wooden material (1) and applying a print to the outer veneer surface, wherein the embossing and the applying the print generate a synchronous decoration formed by embossing and print.

16. The method according to claim 1, wherein the first veneer (5a) and the second veneer (5b) are of different material.

17. The method according to claim 1, wherein the thickness of the second veneer amounts to 0.15 times to 0.3 times that of the thickness of the first veneer.

18. The method according to claim 1, wherein the first veneer and the second veneer have different colors.

19. The method according to claim 1, further comprising removing a portion of the second veneer, or both the second veneer and the first veneer, in the wooden material.

20. The method according to claim 19, wherein removing a portion comprises applying a chamfer to a side face of the wooden material.

21. The method according to claim 1, wherein applying the synthetic resin to the only one surface comprises applying the synthetic resin as a paper or non-woven impregnated with the synthetic resin.

22. The method according to claim 1, wherein a first backside veneer and a second backside veneer bonded with the synthetic resin are arranged on an underside of the supporting plate opposite the first veneer and the second veneer.

* * * * *